US009835254B2

(12) United States Patent
Hsiao et al.

(10) Patent No.: US 9,835,254 B2
(45) Date of Patent: Dec. 5, 2017

(54) SEALED BEARING ASSEMBLY WITH SWING AND MOVEMENT

(71) Applicant: APPLIED NANO TECHNOLOGY SCIENCE, INC., Hsinchu County (TW)

(72) Inventors: Min-Su Hsiao, Hsinchu County (TW); Wen-Hao Wen, Hsinchu County (TW); Chun-Ming Lin, Hsinchu County (TW); Ta-Jung Su, Hsinchu County (TW)

(73) Assignee: APPLIED NANO TECHNOLOGY SCIENCE, INC., Hsin Chu (TW)

( * ) Notice: Subject to any disclaimer, the term of this patent is extended or adjusted under 35 U.S.C. 154(b) by 0 days.

(21) Appl. No.: 14/538,817

(22) Filed: Nov. 12, 2014

(65) Prior Publication Data

US 2016/0061262 A1     Mar. 3, 2016

(30) Foreign Application Priority Data

Sep. 2, 2014 (TW) .............................. 103130279 A

(51) Int. Cl.
 *F16J 15/43* (2006.01)
 *F16C 33/74* (2006.01)
 *F16J 15/52* (2006.01)

(52) U.S. Cl.
 CPC ............. *F16J 15/43* (2013.01); *F16C 33/746* (2013.01); *F16J 15/52* (2013.01)

(58) Field of Classification Search
 CPC .. B01F 2015/00084; B01F 2015/00097; B01F 2015/0011; F16C 33/746; F16C 33/765; F16C 33/723; F16C 33/6644; F16C 32/0637; F16C 29/08; F16C 29/082; F16C 29/084; F16C 29/088; F16C 2210/06; F16J 15/43; F16J 15/52
 See application file for complete search history.

(56) References Cited

U.S. PATENT DOCUMENTS

| | | | | |
|---|---|---|---|---|
| 541,658 A * | 6/1895 | Crooke | ............... | C22B 15/0063 210/262 |
| 2,116,099 A * | 5/1938 | Chamberlain | .......... | B01F 7/021 248/606 |
| 2,584,202 A * | 2/1952 | Harp, Sr. | ................. | A01J 11/04 261/75 |
| 3,120,948 A * | 2/1964 | Stratienko | ........... | B01F 7/00941 277/397 |
| 3,284,067 A * | 11/1966 | Mattern | ................. | B01D 1/225 261/84 |
| 3,967,023 A * | 6/1976 | Lysek | ................ | B23Q 11/0816 193/35 C |
| 5,597,147 A * | 1/1997 | Hashi | ..................... | A47B 81/06 16/319 |
| 5,676,472 A * | 10/1997 | Solomon | .............. | B25J 19/0075 277/347 |
| 5,784,925 A * | 7/1998 | Trost | ..................... | F16C 29/025 250/442.11 |

(Continued)

FOREIGN PATENT DOCUMENTS

DE     102005045958 A1 *  11/2006   ............ F16C 33/109

*Primary Examiner* — Alan B Waits
(74) *Attorney, Agent, or Firm* — Chih Feng Yeh; Huntington IP Consulting Co., Ltd.

(57) ABSTRACT

A sealed bearing assembly comprises a bellows to allow a shaft swing and move, and maintains the sealing under stringent conditions.

9 Claims, 7 Drawing Sheets

(56) References Cited

U.S. PATENT DOCUMENTS

| | | | | |
|---|---|---|---|---|
| 6,217,455 B1* | 4/2001 | Yanata | ................... | A01B 71/06 |
| | | | | 464/113 |
| 6,296,413 B1* | 10/2001 | McCann | ............ | B23Q 11/0816 |
| | | | | 384/15 |
| 6,471,394 B2* | 10/2002 | Kesig | ........................ | B01F 7/02 |
| | | | | 366/331 |
| 6,883,960 B2* | 4/2005 | Reeder | ................. | B01F 7/1655 |
| | | | | 366/243 |
| 7,510,333 B2* | 3/2009 | Tanner | ................. | F16C 23/084 |
| | | | | 384/492 |
| 7,832,922 B2* | 11/2010 | Schoeb | ............... | B01F 7/00716 |
| | | | | 366/273 |
| 7,926,378 B2* | 4/2011 | Saito | ........................ | B62D 3/12 |
| | | | | 74/388 PS |
| 8,166,838 B2* | 5/2012 | Shirai | ................... | F16C 29/063 |
| | | | | 384/43 |
| 8,376,329 B2* | 2/2013 | Michel | ................... | B60G 7/005 |
| | | | | 267/140.5 |
| 8,556,737 B2* | 10/2013 | Yamauchi | ............... | B60B 27/00 |
| | | | | 464/178 |
| 8,616,587 B2* | 12/2013 | Izumi | ................... | F16L 59/141 |
| | | | | 285/272 |
| 2002/0172092 A1* | 11/2002 | Reeder | ................. | B01F 7/1655 |
| | | | | 366/270 |
| 2013/0193647 A1* | 8/2013 | Honda | ................. | F16C 33/746 |
| | | | | 277/410 |

* cited by examiner

SEALED BEARING ASSEMBLY WITH SWING AND MOVEMENT

CROSS-REFERENCE TO RELATED APPLICATION

The application claims the benefit of TAIWAN patent application of Serial No 103130279, filed on Sep. 2, 2014, which is herein incorporated by reference.

TECHNICAL FIELD

The invention is relevant to a bearing assembly, especially a sealed bearing assembly.

BACKGROUND OF RELATED ART

To allow the bearing assembly being operated safely and consistently under the required conditions, the bearing assembly requires sealing to prevent leakage of the lubricant within the assembly, and to prevent external dust, moisture, foreign substances, liquids, gases and other substances from entering into the bearing assembly. The assembly of elements for such purpose is the sealed bearing assembly.

With the advancement of technology, the requirements for the sealed bearing assembly are rising, and the applications of the sealed bearing assembly increase tremendously. Thus, there is a requirement for the sealed bearing assembly that allows adjusting the angle of its shaft relative to the window of a chamber with good sealing effect when the sealed bearing assembly is installed in the chamber.

For example, when the sealed bearing assembly is applied to the roller brush, the roller brush has to be adjusted by moving up and down. However, the rotation speed of the roller brush may reach thousand revolutions per minute or the object to be isolated may be in high temperature or is alkaline solution, and thus the general seal cannot work even if displacement of the roller brush is merely 10 mm. Further, air or gas curtain isolation cannot work because it will cause crystallization problem, and costs will rise.

Therefore, a device allowing the displacement and swing of the shaft without damage the sealing effect is required to solve the above-mentioned problems.

SUMMARY

The invention aims to resolve the above-mentioned problems.

An embodiment of the invention provides a sealed bearing assembly including: a sealed bearing including a shell and a shaft; and a bellows containing the sealed bearing and having a fixed end used for connecting to a chamber wall and a free end used for connecting to the shell of the sealed bearing, wherein the shell including an adjustment hole, and the shaft passes through the adjustment hole, which has a diameter larger than that of the shaft.

Alternatively, the sealed bearing of the sealed bearing assembly further comprises: a sealing ring fixed to the shaft, and the sealing ring is cylindrical, an axis of the sealing ring is identical to the axis of the shaft; an inner magnetic ring being provided in the sealing ring and being surrounding the shaft; an external magnetic ring being housed inside the shell and being surrounding the inner magnetic ring; and a ferrofluid being attracted by a magnetic force of the external magnetic ring to be distributed on a surface of the shell toward the shaft, wherein when the shaft moves linearly relative to the shell and the inner magnetic ring moves with the sealing ring to a section of the external magnetic ring, a magnetic force is generated between the inner magnetic ring and the section of the external magnetic ring to attract the ferrofluid to flow, and thus the ferrofluid forms a shaft seal between the inner magnetic ring and the section of the external magnetic ring by surrounding a periphery of the sealing ring to block gas or liquid in the sealing ring.

When the bellows of the invention is used to move the shaft up and down or forward and backward, in general, the sealed bearing assembly of the invention can work with the shaft extending in the axial direction from 10 to 50 mm. As to the stroke of the linear displacement of the shaft depends on the stroke of the bellows. The experiments has proved that the sealed bearing assembly of the invention can work without leak while the rotational speed of the shaft reaches 1000 revolutions per minute.

The ferrofluid is composed of magnetic particles, the surfactant molecules, and liquid carrier. Magnetic particles are nanoscale ferromagnetic molecules coated with surfactant molecules, and evenly dispersed in the liquid carrier, like a mass of flowing ferromagnetic material. When affected by magnetic field, the ferrofluid is distributed along the magnetic field lines and forms various shapes. To block a gap, the ferrofluid can be used together with the magnetic field to form the barrier to block both sides of the barrier. The present invention uses the feature the ferrofluid can be attracted and moved by the magnetic force to achieve the sealing effect not only when the shaft rotates in a rotational direction but also when the shaft moves in a straight line.

Based on the experimental results, the sealed bearing assembly of the present invention is able to maintain a good sealing effect in the following conditions: 1*E-7 torr vacuum, 2 atm pressure difference, 0~80° C. temperature range, 20 mm shaft diameter, 300 mm linear displacement stroke, 25 mm/sec linear displacement speed, and 200 RPM rotation speed.

BRIEF DESCRIPTION OF THE DRAWING

The primitive objectives and advantages of the present invention will become apparent upon reading the following description and upon reference to the accompanying drawings in which.

DETAILED DESCRIPTION

In order to fully understand the manner in which the above-recited details and other advantages and objects according to the invention are obtained, a more detailed description of the invention will be rendered by reference to the best-contemplated mode and specific embodiments thereof. The following description of the invention is made for the purpose of illustrating the general principles of the invention and should not be taken in a limiting sense; it is intended to illustrate various embodiments of the invention. As such, the specific modifications discussed are not to be construed as limitations on the scope of the invention. It will be apparent to one skilled in the art that various equivalents, changes, and modifications may be made without departing from the scope of the invention, and it is understood that such equivalent embodiments are to be included herein. The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section. Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list.

Preferred embodiments and aspects of the invention will be described to explain the scope, structures and procedures of the invention. In addition to the preferred embodiments of the specification, the present invention can be widely applied in other embodiments.

Figure 1A:
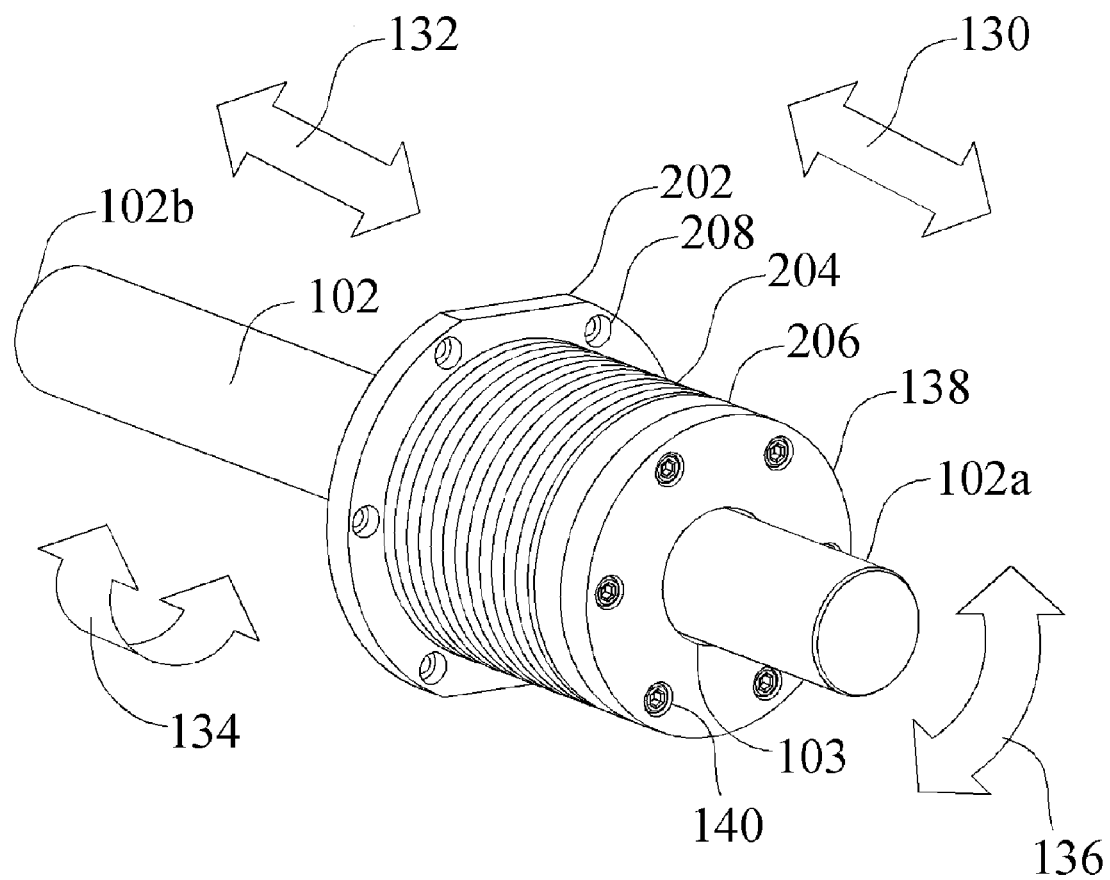
FIG. 1A illustrates a perspective view of the sealed bearing assembly viewed from the free end based on an embodiment of the invention.
Figure 1B:
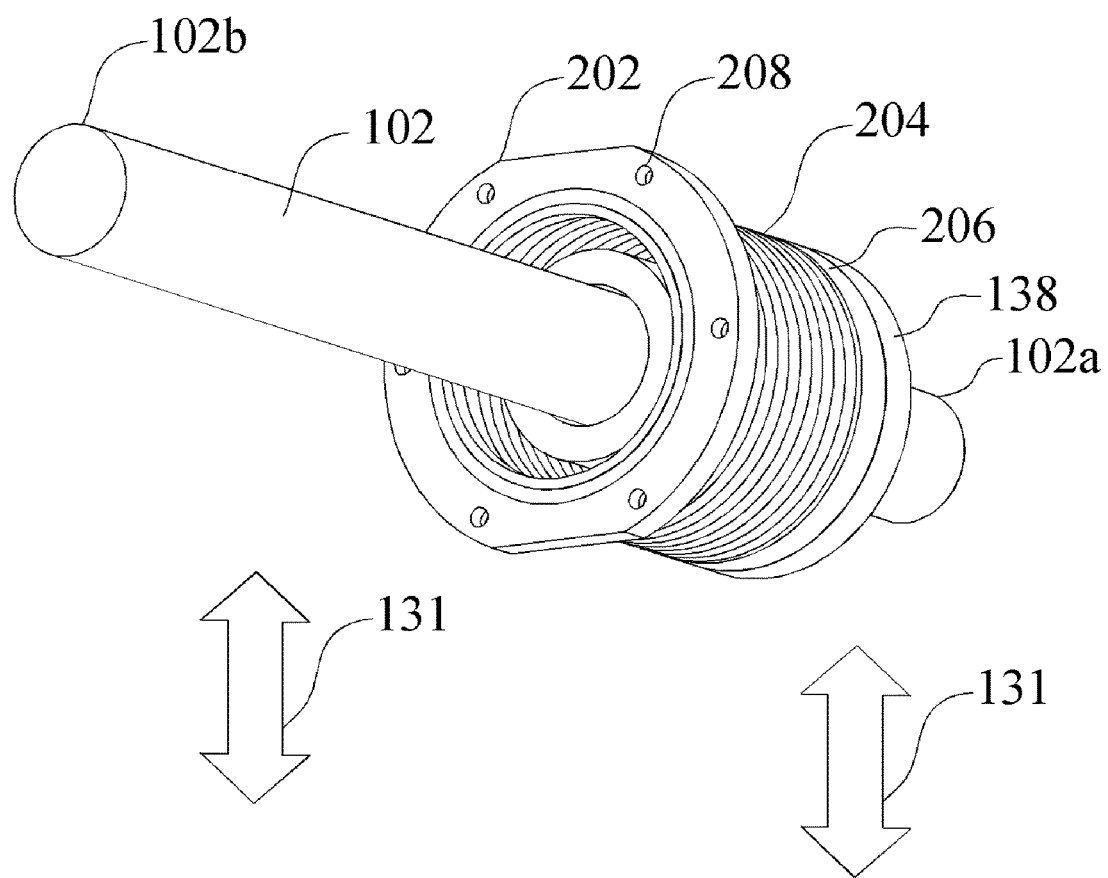
FIG. 1B illustrates a perspective view of the sealed bearing assembly viewed from the fixed end based on an embodiment of the invention.

FIG. 1A illustrates a perspective view of the sealed bearing assembly 100 viewed from the free end 206 based on an embodiment of the invention, and FIG. 1B illustrates a perspective view cross-section of the sealed bearing assembly 100 viewed from the fixed end 202 based on an embodiment of the invention. The sealed bearing assembly 100 has a bellows 204 used for containing a sealed bearing. When the sealed bearing assembly 100 is installed in the interface between the liquid and the air, for example, the chamber wall of a stirred tank, the bellows 204 and the stirring end 102a of the shaft 102 can be put into the stirred tank (not shown), and a controlling end 102b of the shaft 102 can pass through a window of the chamber wall of the stirred tank. The bellows 204 has a fixed end 202 used for connecting to the chamber wall.

Further, the fixed end 202 can be annular, and fixed on the periphery of the window of the chamber wall of the stirred tank by bolting one or more fixing hole 208 of the fixed end 202 and a washer 210. When the bellows 204 contains the sealed bearing, a free end 206 of the bellows 204 is connected to a shell (116 of FIG. 2) of the sealed bearing. The shell 116 can has a mounting ring 138, which has one or more mounting hole 140 used for connecting the free end 206 of the bellows 204.

Figure 2:
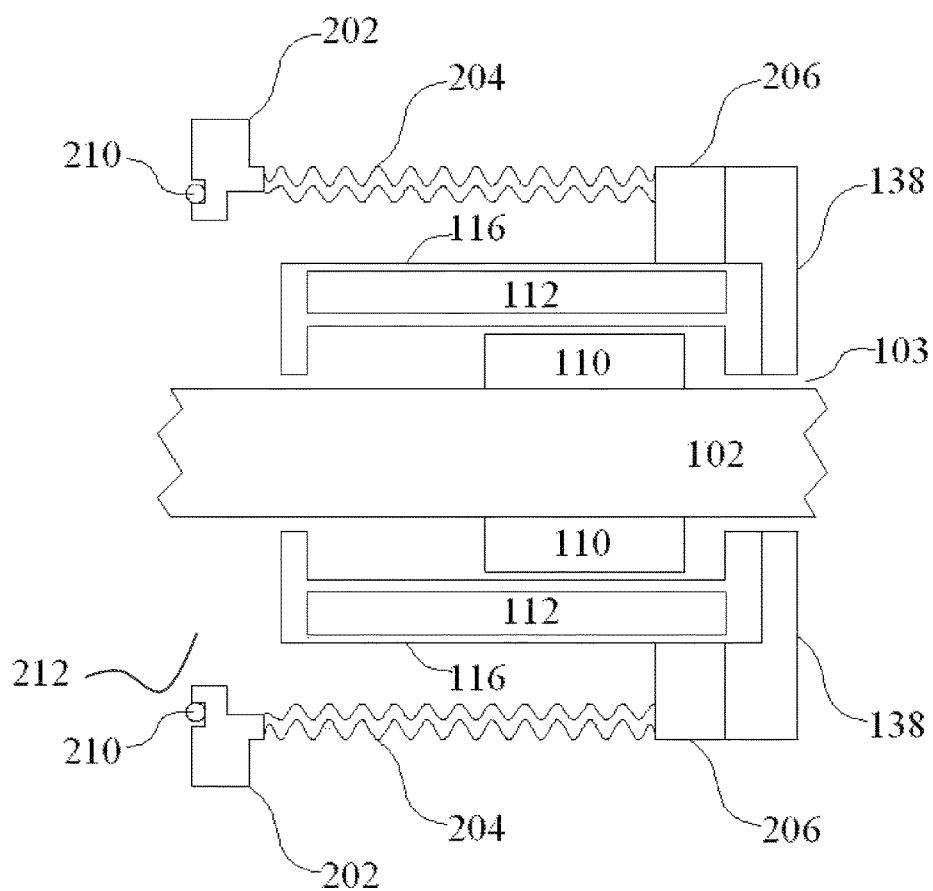
FIG. 2 illustrates a cross-section of the sealed bearing assembly shown in FIGS. 1A and 1B.

By referring to FIG. 2, the fixed end 202 of the bellows 204 has an adjustment hole 212, and the controlling end 102b of the shaft 102 passes through the adjustment hole 212, whose diameter is larger than the diameter of the shaft 102 and leaves space. By referring to FIG. 1A, the shaft 102 can move a first parallel displacement 130 along the axis of the shaft 102 relative to the fixed end 202 because the bellows 204 can be extended and contracted. Further, with the adjustment hole 212, whose diameter is larger than the diameter of the shaft 102 and leaves space, the bellows 204 can be bent and thus can be used to swing the shaft 102 in the swing direction 136 shown in FIG. 1A. Further, by referring to FIG. 1B, the bellows 204 can be used to move the shaft 102 a vertical displacement 131, which is vertical to the shaft 102. Wherein, the swing direction 136 can be horizontal, vertical to the ground, or any direction, and the vertical displacement 131 can be horizontal, vertical to the ground, or any direction. Thus, with the usage of the bellows 204, the shaft 102 can be moved or swung in multiple directions but the sealed bearing assembly can still keep the sealing effect to prevent the liquid of the stirred tank spilled from the window.

Therefore, by using the sealed bearing assembly of the invention in the roller brush, the shaft 102 can be adjusted by moving up and down in the vertical displacement 131 without spilling the liquid even though the roller brush is rotated in high speed or the liquid is alkaline or in high temperature. Therefore, the invention can achieve an important effect required by the industries.

By referring to FIG. 1A, the mounting ring 138 has a shaft hole 103 to contain the shaft 102, which rotates in a rotational direction 134. Without damaging the sealing, the shaft 102 can move a first parallel displacement 130 along the axis of the shaft 102 relative to the fixed end 202, and can further move a second parallel displacement 132 relative to the mounting ring 138.

The gas or liquid from the environment may flow into the sealed bearing assembly through the shaft hole 103, but is stopped by the sealed bearing assembly 100. The structure of the sealed bearing assembly goes as follows. FIG. 2 illustrates a cross-section of the sealed bearing assembly shown in FIGS. 1A and 1B. The sealed bearing includes: a shell 116; a shaft 102, and a sealing ring 110, wherein the sealing ring 110 is fixed on and moved with the shaft 102, and the sealing ring 110 is cylindrical. The axis of the sealing ring 110 is identical to the axis of the shaft. An inner magnetic ring 108 is provided in the sealing ring 108 and is surrounding the shaft 102. An external magnetic ring 112 is housed inside the shell 116 and is surrounding the inner magnetic ring 108. Further, a ferrofluid (not shown) between the external magnetic ring 112 and the shaft 102 is attracted by a magnetic force of the external magnetic ring 112 to be distributed on a surface of the shell 116 toward the shaft 102.

Figure 3:
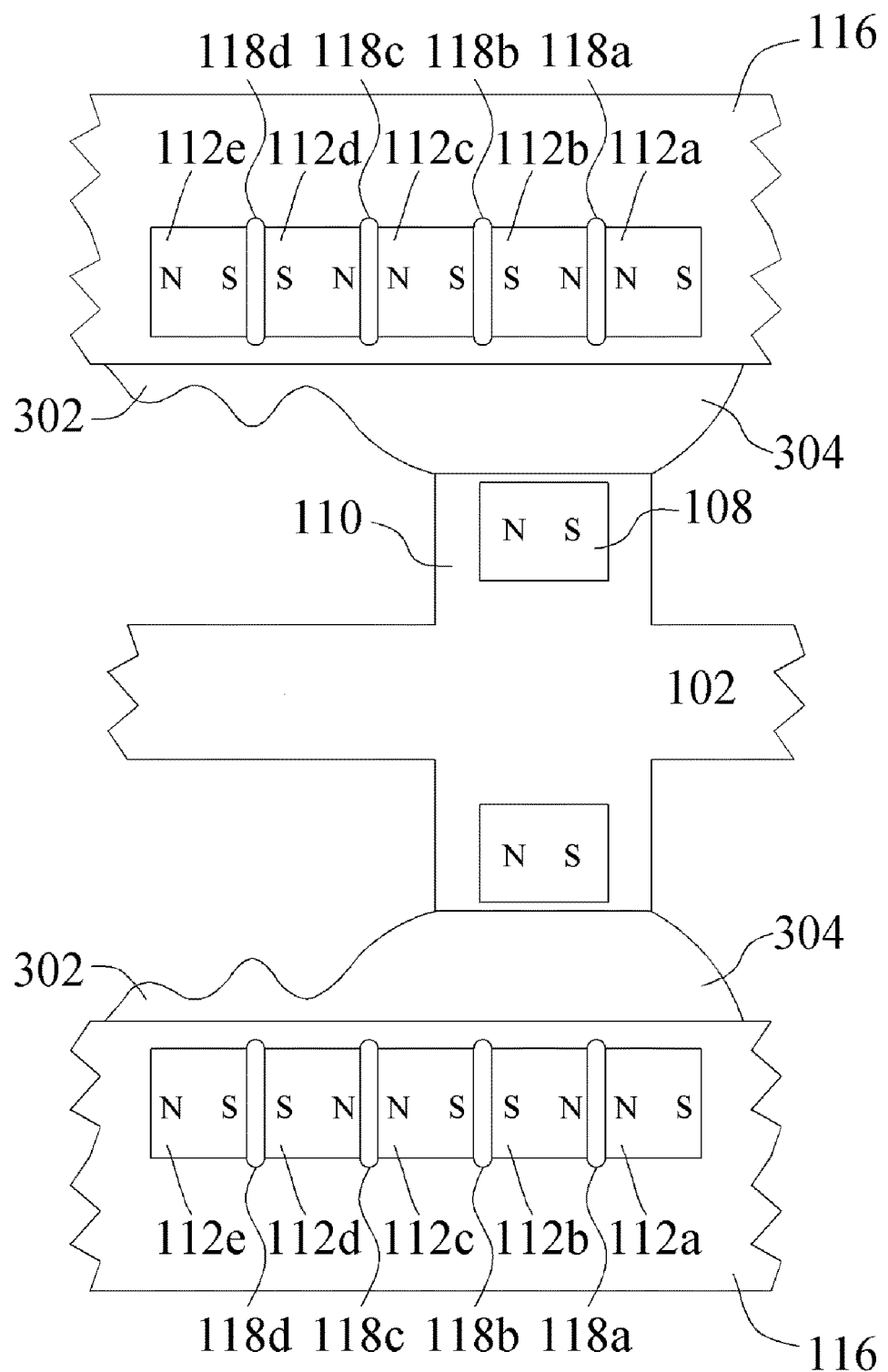
FIG. 3 is an enlarged view of the sealed bearing in the cross-section of the sealed bearing assembly of FIG. 2.

FIG. 3 is an enlarged view of the sealed bearing in the cross-section of the sealed bearing assembly of FIG. 2. The external magnetic ring has one or more ring-shaped permanent magnet 112a-112e, which surround the inner magnetic ring 108. A ferrofluid 302 between the external magnetic ring 112 and the shaft 102 is attracted by a magnetic force of the external magnetic ring 112 to be distributed on a surface of the shell 116 toward the shaft 102.

FIG. 3 illustrates that when the inner magnetic ring 108 moves with the sealing ring 110 to a section of the external magnetic ring 112, a magnetic force is generated between the inner magnetic ring 108 and the section of the external magnetic ring 112 to attract the ferrofluid 302 to flow, and thus the ferrofluid 302 forms a shaft seal 304 between the inner magnetic ring 108 and the section of the external magnetic ring 112 by surrounding a periphery of the sealing ring 110 to block gas or liquid in the sealing ring 110. Therefore, the sealing ring 110 can be used as a boundary blocking the flow of gas or liquid in the sealing ring 110.

By referring to FIG. 1A, when the shaft 102 moves linearly a second parallel displacement 132 relative to the mounting ring 138, and, by referring to FIG. 2, the shaft 102 also moves linearly a second parallel displacement 132 relative to the shell 116. By referring to FIG. 2, when the sealing ring 110 and the inner magnetic ring 108 inside the sealing ring 110 move with the shaft 102, and such movement induces the movement of the ferrofluid 302 and the shaft seal 304 formed by the ferrofluid 302. Therefore, the sealing is not damaged and can prevent the communication between the gas and liquid inside or outside the sealing ring 110.

To sum up, based on the property that ferrofluid 302 can be attracted and moved by the magnetic force, the structure of the invention can achieve the sealing effect while the shaft 102 can not only rotate in the rotational direction 134 as shown in FIG. 1A, but also move a second parallel displacement 132 relative to the mounting ring 138.

Figure 4:
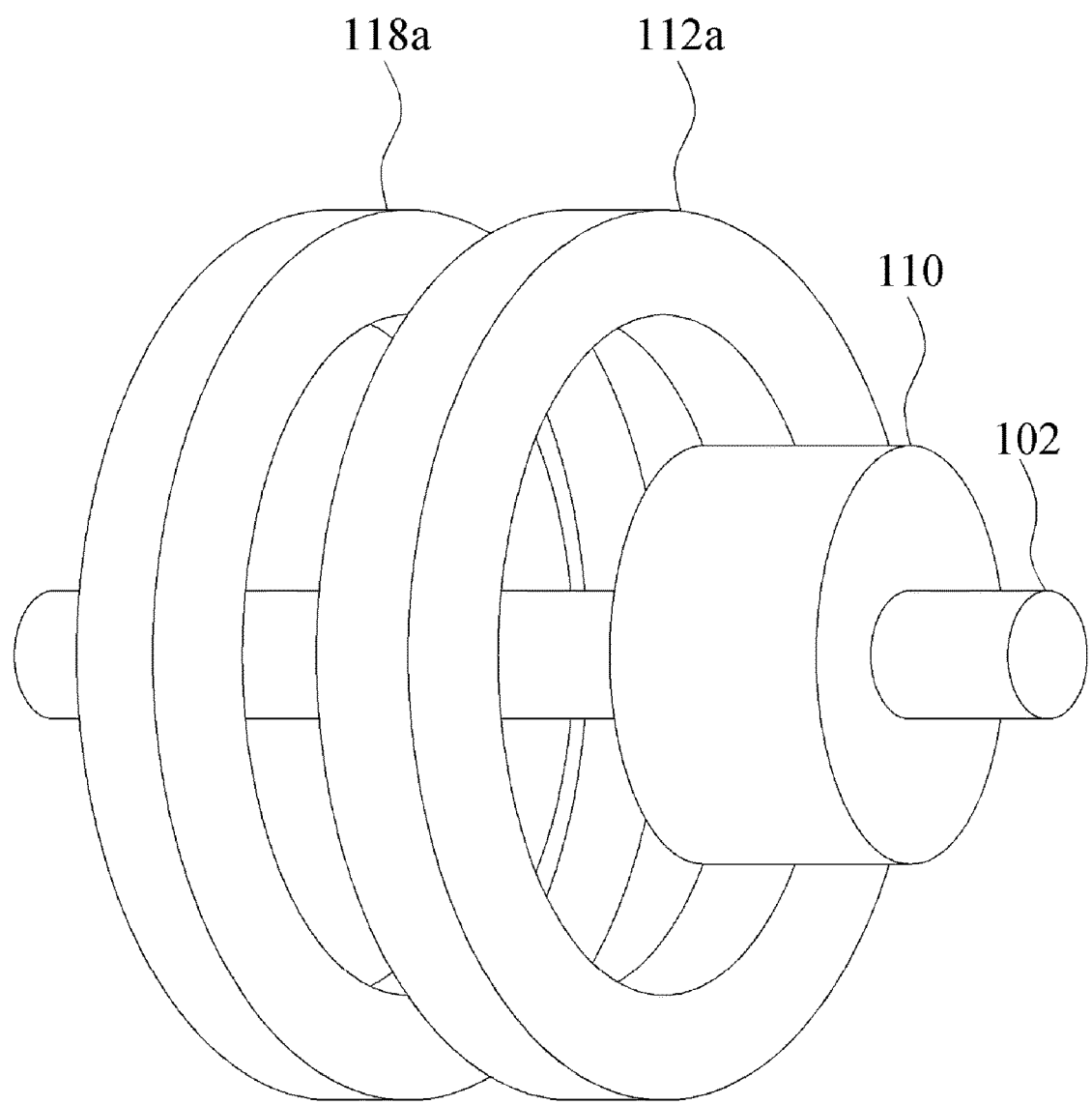
FIG. 4 is the perspective view illustrating elements of the invention.

FIG. 4 is the perspective view illustrating elements of the invention. As shown, the shaft 102 and the sealing ring 110 of the present invention are cylindrical, and the ring-shaped permanent magnet 112a and the permeable ring 118a are annular.

Alternatively, the ring-shaped permanent magnets 112a-112e of the external magnetic ring 112 are arranged with same magnetic poles placed adjacently, as shown in FIG. 3. For example, the N pole of the ring-shaped permanent magnet 112a is adjacent to the N pole of another ring-shaped permanent magnet 112b. The advantages of the arrangement of the magnets with the same magnetic poles placed adjacently will be described hereinafter with reference to FIGS. 5 and 6.

Alternatively, each two of the ring-shaped permanent magnets 112a-112e of the external magnetic ring 112 are separated by one of the permeable rings 118a-118d, which surround the inner magnetic ring 108, shown in FIG. 3.

Alternatively, the external magnetic ring 112 can be a permanent magnet or an electrical magnet. That is, the external magnetic ring 112 may be an electromagnetic coil controlled by the current to produce the electromagnetic induction, and the magnetic force. Similarly, the inner magnetic ring 108 can be a permanent magnet or an electrical magnet. That is, the inner magnetic ring 108 may be an electromagnetic coil controlled by the current to produce the electromagnetic induction, and the magnetic force.

Figure 5:
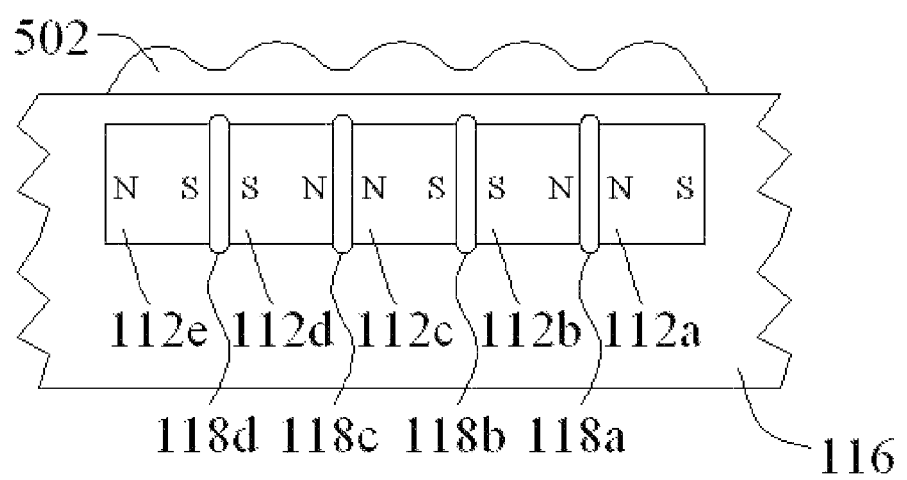
FIG. 5 shows the distribution of the ferrofluid on a surface of the shell toward the shaft when the ring-shaped permanent magnets of the external magnetic ring are arranged with same magnetic poles placed adjacently.

FIG. 5 shows the distribution of the ferrofluid 502 on a surface of the shell 116 toward the shaft when the ring-shaped permanent magnets 112a-112e of the external magnetic ring are arranged with same magnetic poles placed adjacently. The experiments prove that when the sealing ring 110 and the inner magnetic ring 108 are not close to the ring-shaped permanent magnets 112a-112e, the magnetic field generated by the ring-shaped permanent magnets 112a-112e makes ferrofluid 502 evenly distributed in wavy shape on the surface of the shell 116 toward the shaft 102 because the ring-shaped permanent magnets 112a-112e of the external magnetic ring are arranged with same magnetic poles placed adjacently. While the sealing ring 110 and the inner magnetic ring 108 get close to the ring-shaped permanent magnets 112a-112e, the resulted effect will make the magnetic circuits connected in part and result in the shaft seal 304 shown in FIG. 3, which can achieve the sealing effect. Therefore, the arrangement of the ring-shaped permanent magnets 112a-112e with the same magnetic poles placed adjacently is suitable for the invention.

Figure 6:
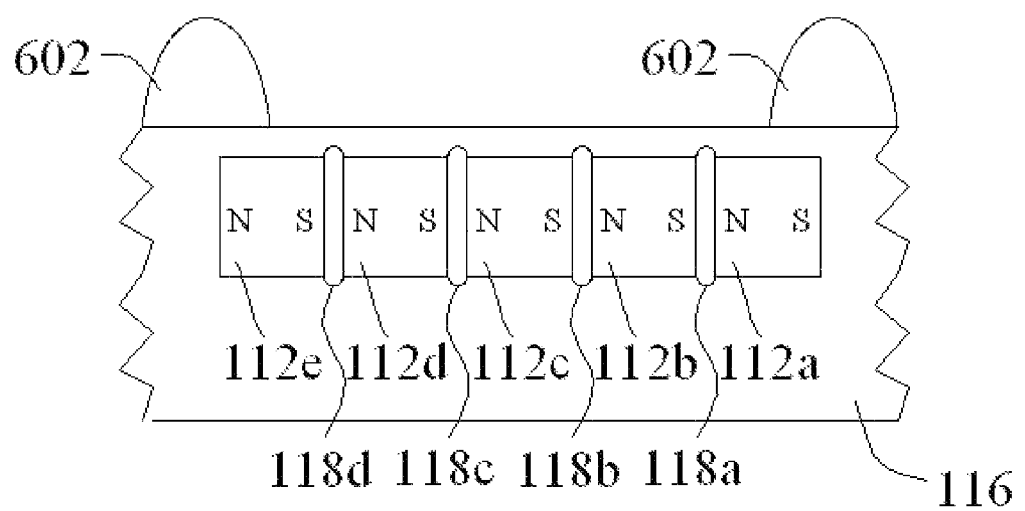
FIG. 6 shows the distribution of the ferrofluid on a surface of the shell toward the shaft when the ring-shaped permanent magnets of the external magnetic ring are arranged with different magnetic poles placed adjacently.

FIG. 6 shows the distribution of the ferrofluid 602 on a surface of the shell 116 toward the shaft when the ring-shaped permanent magnets 112a-112e of the external magnetic ring are arranged with different magnetic poles placed adjacently. The experiments prove that when the sealing ring 110 and the inner magnetic ring 108 are not close to the ring-shaped permanent magnets 112a-112e, the magnetic field generated by the ring-shaped permanent magnets 112a-112e makes ferrofluid 502 centralized two ends of the surface of the shell 116 toward the shaft 102 because the ring-shaped permanent magnets 112a-112e of the external magnetic ring are arranged with different magnetic poles placed adjacently. While the sealing ring 110 and the inner magnetic ring 108 get close to the ring-shaped permanent magnets 112a-112e, the resulted effect cannot make the magnetic circuits connected in part and thus cannot result in the shaft seal 304 shown in FIG. 3, which can achieve the sealing effect. Therefore, the arrangement of the ring-shaped permanent magnets 112a-112e with the different magnetic poles placed adjacently is not suitable for the invention.

The foregoing description, for purposes of explanation, was set forth in specific details of the preferred embodiments to provide a thorough understanding of the invention. However, it will be apparent to one skilled in the art that specific details are not required in order to practice the invention. Therefore, the foregoing descriptions of specific embodiments of the invention are presented for purposes of illustration and description only and should not be construed in any way to limit the scope of the invention. They are not intended to be exhaustive or to limit the invention to the precise forms disclosed; obviously, many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following Claims and their equivalents define the scope of the invention.

The above-described embodiments of the present invention are intended to be illustrative only. Numerous alternative embodiments may be devised by those skilled in the art without departing from the scope of the following claims.

What is claimed is:

1. A magnetic sealed bearing assembly including:
   a shaft;
   a sealing ring being fixed on and moved with the shaft, wherein the sealing ring is cylindrical, and an axis of the sealing ring is co-axial to an axis of the shaft;
   a shell;
   a ferrofluid; and
   a bellows, having a fixed end connected to a chamber wall and a free end connected to the shell, wherein the bellows is able to be extended, contracted, and bent,
   wherein the sealing ring has an inner magnetic ring, which surrounds the shaft, and the shell has an external magnetic ring, which surrounds the inner magnetic ring;
   wherein the shell includes an adjustment hole, the shaft passes through the adjustment hole, which has a diameter larger than that of the shaft, and the shaft rotates in a rotational direction; and
   wherein the ferrofluid is attracted by a magnetic force of the external magnetic ring to be distributed on a surface of the shell toward the shaft, and when the shaft moves linearly relative to the shell and the inner magnetic ring moves with the sealing ring to a section of the external magnetic ring, a magnetic force is generated between the inner magnetic ring and the section of the external magnetic ring to attract the ferrofluid to flow, and thus the ferrofluid forms a shaft seal between the inner magnetic ring and the section of the external magnetic ring by surrounding a periphery of the sealing ring to block gas or liquid in the sealing ring.

2. The magnetic sealed bearing assembly of claim 1, wherein the external magnetic ring includes ring-shaped permanent magnets, which surround the inner magnetic ring.

3. The magnetic sealed bearing assembly of claim 2, wherein the ring-shaped permanent magnets of the external magnetic ring are arranged with same magnetic poles placed adjacently.

4. The magnetic sealed bearing assembly of claim 2, wherein each two of the ring-shaped permanent magnets of the external magnetic ring are separated by a permeable ring, which surrounds the inner magnetic ring.

5. The magnetic sealed bearing assembly of claim 1, wherein the fixed end of the bellows comprises one or more fixing hole used for connecting to peripheral of the window of the chamber wall; the free end of the bellows is connected to a mounting ring of the shell; and the mounting ring has one or more mounting hole used for connecting to the free end of the bellows.

6. The magnetic sealed bearing assembly of claim 1, wherein the fixed end of the bellows has an adjustment hole; a controlling end of the shaft passes through the adjustment hole; and the adjustment hole is larger than the shaft hole to allow an adjustment of the shaft.

7. The magnetic sealed bearing assembly of claim 1, wherein the external magnetic ring is an electrical magnet.

8. The magnetic sealed bearing assembly of claim 1, wherein the inner magnetic ring is a permanent magnet.

9. The magnetic sealed bearing assembly of claim 1, wherein the inner magnetic ring is an electrical magnet.

* * * * *